US011350327B2

(12) United States Patent
Cao (10) Patent No.: US 11,350,327 B2
(45) Date of Patent: May 31, 2022

(54) CARRIER AGGREGATION-BASED CONFIGURATION METHOD AND RELATED DEVICES

(71) Applicant: GUANGDONG OPPO MOBILE TELECOMMUNICATIONS CORP., LTD., Guangdong (CN)

(72) Inventor: Jun Cao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 38 days.

(21) Appl. No.: 17/131,249

(22) Filed: Dec. 22, 2020

(65) Prior Publication Data

US 2021/0112468 A1    Apr. 15, 2021

Related U.S. Application Data

(63) Continuation of application No. PCT/CN2019/090198, filed on Jun. 5, 2019.

(30) Foreign Application Priority Data

Jul. 24, 2018  (CN) .......................... 201810819477.0

(51) Int. Cl.
*H04W 36/00* (2009.01)
*H04L 5/00* (2006.01)
(Continued)

(52) U.S. Cl.
CPC ......... *H04W 36/0077* (2013.01); *H04L 5/001* (2013.01); *H04W 8/08* (2013.01);
(Continued)

(58) Field of Classification Search
CPC . H04W 36/0077; H04W 36/08; H04W 36/32; H04W 8/08; H04W 8/24; H04W 48/16; H04W 48/18
See application file for complete search history.

(56) References Cited

U.S. PATENT DOCUMENTS

2017/0238316 A1   8/2017  Li et al.
2017/0367073 A1  12/2017  Murugan et al.
(Continued)

FOREIGN PATENT DOCUMENTS

CN      102378370        3/2012
CN      102781044       11/2012
(Continued)

OTHER PUBLICATIONS

SIPO, Notification to Grant Patent Right for Invention for CN Application No. 201810819477.0, dated Jul. 28, 2020.
(Continued)

*Primary Examiner* — Wayne H Cai
(74) *Attorney, Agent, or Firm* — Hodgson Russ LLP (57) ABSTRACT

A configuration aggregation (CA)-based configuration method and related devices are provided, which are applicable to an electronic device. The method includes the following. Target information is determined, where the target information includes a mobile country code (MCC) and/or a mobile network code (MNC). A target set is determined according to the target information, where the target set includes multiple CA combinations supported by the electronic device. A target request is sent to an operator server, where the target request carries the target set, and the target request is used to instruct to select from the target set a CA combination for network configuration. A target CA combination is received, where the target CA combination is sent by the operator server in response to the target request.
(Continued)

Network configuration is performed according to the target CA combination.

20 Claims, 4 Drawing Sheets

(51) Int. Cl.

| | |
|---|---|
| *H04W 8/08* | (2009.01) |
| *H04W 8/24* | (2009.01) |
| *H04W 36/08* | (2009.01) |
| *H04W 36/32* | (2009.01) |
| *H04W 48/16* | (2009.01) |
| *H04W 48/18* | (2009.01) |

(52) U.S. Cl.
CPC ............ *H04W 8/24* (2013.01); *H04W 36/08* (2013.01); *H04W 36/32* (2013.01); *H04W 48/16* (2013.01); *H04W 48/18* (2013.01)

(56) References Cited

U.S. PATENT DOCUMENTS

| | | | |
|---|---|---|---|
| 2018/0070250 A1 | 3/2018 | Venkataraman et al. | |
| 2019/0281604 A1* | 9/2019 | Kim | ............. H04W 72/12 |
| 2020/0178083 A1* | 6/2020 | Richards | ............. H04W 16/14 |

FOREIGN PATENT DOCUMENTS

| | | |
|---|---|---|
| CN | 103391533 | 11/2013 |
| CN | 103580781 | 2/2014 |
| CN | 104054297 | 9/2014 |
| CN | 104144447 | 11/2014 |
| CN | 105517130 | 4/2016 |
| CN | 105915325 | 8/2016 |
| CN | 106160964 | 11/2016 |
| CN | 106160985 | 11/2016 |
| CN | 106550355 | 3/2017 |
| CN | 106878980 | 6/2017 |
| CN | 108566311 | 9/2018 |
| CN | 109039563 | 12/2018 |
| WO | 2013184670 | 12/2013 |
| WO | 2018076302 | 5/2018 |
| WO | 2018118174 | 6/2018 |

OTHER PUBLICATIONS

SIPO, First Office Action for CN Application No. 201810819477.0, dated Feb. 3, 2020.
SIPO, Second Office Action for CN Application No. 201810819477.0, dated Apr. 21, 2020.
WIPO ISR for PCT/CN2019/090198, dated Aug. 29, 2019.
EPO, Extended European Search Report for EP Application No. 19841231.4, dated Jun. 4, 2021.
Nokia Germany, "Mobile Edge Computing (MEC); Radio Network Information API," Draft ETSI GS MEC 012, Apr. 2017, v1.0.1, 56 pages.

* cited by examiner

CARRIER AGGREGATION-BASED CONFIGURATION METHOD AND RELATED DEVICES

CROSS REFERENCE TO RELATED APPLICATION(S)

This application is a continuation of International Application No. PCT/CN2019/090198, filed Jun. 5, 2019, which claims priority to Chinese Application No. 201810819477.0, filed Jul. 24, 2018, the entire disclosures of which are incorporated herein by reference.

TECHNICAL FIELD

This disclosure relates to the technical field of electronic devices, and more particularly to a carrier aggregation (CA)-based configuration method and related devices.

BACKGROUND

With wide popularity of electronic devices (such as mobile phones, tablets, etc.), the electronic device can support an increasing number of applications and is becoming increasingly more powerful. The electronic device is developing in a diversified and personalized manner, thus becoming an indispensable electronic product in people's daily life.

As long term evolution (LTE) frequency bands are increasing at present, CA combinations supported by the electronic device are also increasing, which will result in a redundant load of CA combinations.

SUMMARY

In a first aspect, a CA-based configuration method is provided. The method is applicable to an electronic device. The method includes the following. Target information is determined, where the target information includes a mobile country code (MCC) and/or a mobile network code (MNC). A target set is determined according to the target information, where the target set includes multiple CA combinations supported by the electronic device. A target request is sent to an operator server, where the target request carries the target set, and the target request is used to instruct to select from the target set a target CA combination for network configuration. A target CA combination is received, where the target CA combination is sent by the operator server in response to the target request. Network configuration is performed according to the target CA combination.

In a second aspect, an electronic device is provided. The electronic device includes a processor, a transceiver, and a memory. The memory is configured to store one or more programs which, when executed by the processor, are operable with the processor to: determine target information, wherein the target information comprises at least one of an MCC and an MNC; determine a target set according to the target information, wherein the target set comprises a plurality of CA combinations supported by the electronic device; send a target request, via the transceiver, to an operator server, wherein the target request carries the target set, and the target request is used to instruct to select, from the target set, a CA combination for network configuration; receive, via the transceiver, a target CA combination, wherein the target CA combination is sent by the operator server in response to the target request; perform network configuration according to the target CA combination.

In a third aspect, a non-transitory computer readable storage medium is provided. The non-transitory computer readable storage medium is configured to store computer programs which, when executed by an electronic device, are operable with the electronic device to perform the method of the first aspect.

BRIEF DESCRIPTION OF THE DRAWINGS

In order for clarity in description of technical solution of implementations, the following will give a brief introduction to the accompanying drawings used for describing implementations. Apparently, the accompanying drawings described below are some implementations of the disclosure. Based on these drawings, those of ordinary skill in the art can also obtain other drawings without creative effort.

DETAILED DESCRIPTION

In order for those skilled in the art to better understand technical solution of implementations, technical solution of implementations will be described clearly and completely with reference to accompanying drawings in the implementations. Apparently, implementations hereinafter described are merely some implementations, rather than all implementations, of the disclosure. All other implementations obtained by those of ordinary skill in the art based on the implementations herein without creative efforts shall fall within the protection scope of the disclosure.

Implementations will be described in detail below.

The terms "first", "second", "third", "fourth", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Figure 1:
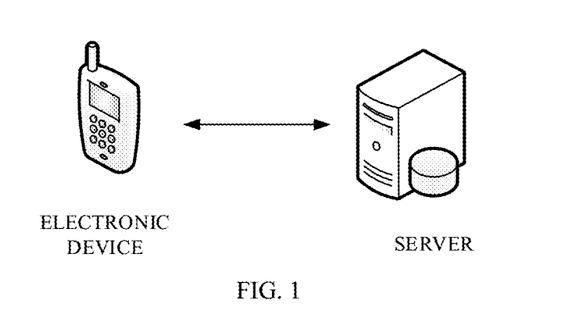
FIG. 1 is a schematic structural diagram of a CA-based configuration system according to implementations.

FIG. 1 is a schematic structural diagram of a CA-based configuration system according to implementations. As illustrated in FIG. 1, the CA-based configuration system of implementations includes an electronic device and an operator server. The electronic device is in a communication connection with the operator server through wireless technology.

The electronic device may include various handheld devices, in-vehicle devices, wearable devices, computing devices that have wireless communication functions, or other processing devices connected to a wireless modem, as well as various forms of user equipment (UE), mobile stations (MS), terminal devices, and the like.

The operator server refers to a device that is capable of undertaking and guaranteeing services and is responsible for providing mobile communication services to users.

An operating principle of the CA-based configuration system provided herein is as follows. The electronic device determines target information, where the target information includes a mobile country code (MCC) and/or a mobile network code (MNC). The electronic device determines a target set according to the target information, where the target set includes multiple CA combinations supported by the electronic device. The electronic device sends a target request to the operator server, where the target request carries the target set, and the target request is used to instruct to select from the target set a CA combination for network configuration. The operator server selects, from the target set, a target CA combination. The target CA combination is for network configuration. The operator server sends the selected CA combination to the electronic device. The electronic device performs network configuration according to the CA combination. As such, it is possible to solve a problem of redundancy in load of CA combinations.

Figure 2:
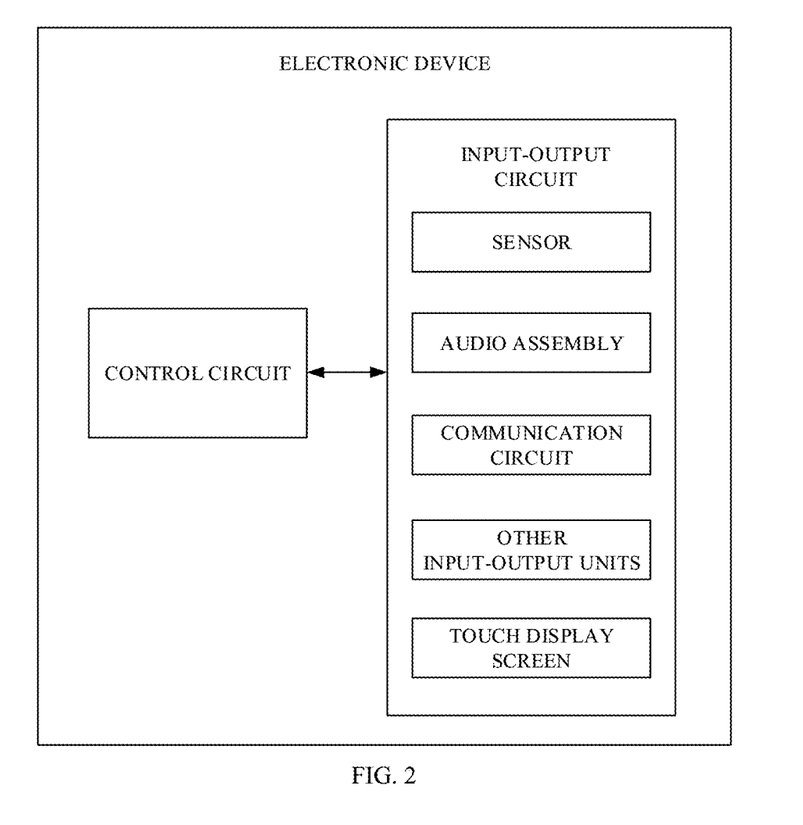
FIG. 2 is a schematic structural diagram of an electronic device according to implementations.

FIG. 2 is a schematic structural diagram of an electronic device according to implementations. As illustrated in FIG. 2, the electronic device includes a control circuit and an input-output circuit. The input-output circuit is coupled with the control circuit.

The control circuit can include a store-and-process circuit. The store-and-process circuit has a storing circuit which may be a memory, such as a hard drive memory, a non-volatile memory (such as a flash memory, other electronically programmable read-only memories used to form a solid-state drive, or the like), a volatile memory (such as a static random access memory, a dynamic random access memory, or the like, or the like, and the disclosure is not limited in this regard. The store-and-process circuit has a processing circuit to control operations of the electronic device. The processing circuit can be implemented based on one or more microprocessors, microcontrollers, digital signal processors, baseband processors, power management units, audio codec chips, application-specific integrated circuits, display driver integrated circuits, or the like.

The store-and-process circuit can be configured to run software of the electronic device, for example, an application for determining target-information, an application for determining a target-set, an application for sending information to other devices, a network configuration application, a media playback application, a voice over Internet protocol (VOIP) phone call application, an operating system function, etc. These applications can be used to perform some control operations such as determining target information, determining a target set, sending a target request to an operator server, performing network configuration according to a target CA combination, playing media files, making a voice phone call, and other functions of the electronic device, which is not limited herein.

The input-output circuit can be configured to achieve data input and data output of the electronic device, that is, to allow the electronic device to receive data from an external device and also allow the electronic device to output data to an external device.

The input-output circuit can further include a sensor. The sensor can include an ambient light sensor, an optical or capacitive infrared proximity sensor, a touch sensor (e.g., based on an optical touch sensor and/or a capacitive touch sensor, where the touch sensor may be a part of a touch display screen or may be used independently as a touch sensor structure), an acceleration sensor, a gravity sensor, and other sensors.

The input-output circuit can further include one or more displays. The displays may include one or more of a liquid crystal display, an organic light emitting diode (OLED) display, an electronic ink display, a plasma display, displays based on other display technologies. As an example, the display includes an array of touch sensors (i.e., the display can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, and implementations are not limited thereto.

The input-output circuit can further include an audio assembly. The audio assembly is configured to provide the electronic device with audio input and output functions. The audio assembly may include ultrasonic sensors, buzzers, tone generators, and other assemblies for generating and detecting sound. The ultrasonic sensor may be a microphone, a speaker, a handset, etc. The ultrasonic sensor has functions of transmitting and receiving sound.

The input-output circuit can further include a communication circuit. The communication circuit is configured to provide the electronic device with the ability to communicate with external devices. For instance, the communication circuit includes analog/digital input-output interface circuits and wireless communication circuits based on radio frequency signals and/or optical signals. The wireless communication circuit of the communication circuit may include a radio frequency transceiver circuit, a power amplifier circuit, a low-noise amplifier, a switch, a filter, and an antenna. As an example, the wireless communication circuit of the communication circuit includes a circuit for supporting near field communication (NFC) by transmitting and receiving near field coupled electromagnetic signals. For example, the communication circuit may include an NFC antenna and an NFC transceiver. The communication circuit may further include transceivers and antennas for cellular telephone, transceiver circuits and antennas for wireless local area network, and the like.

The input-output circuit can further include other input-output units. The other input-output units may include buttons, joysticks, click wheels, scroll wheels, touch pads, keypads, keyboards, cameras, LEDs, and other status indicators.

The electronic device may further include a battery (not illustrated in FIG. 2) for powering the electronic device.

Figure 3:
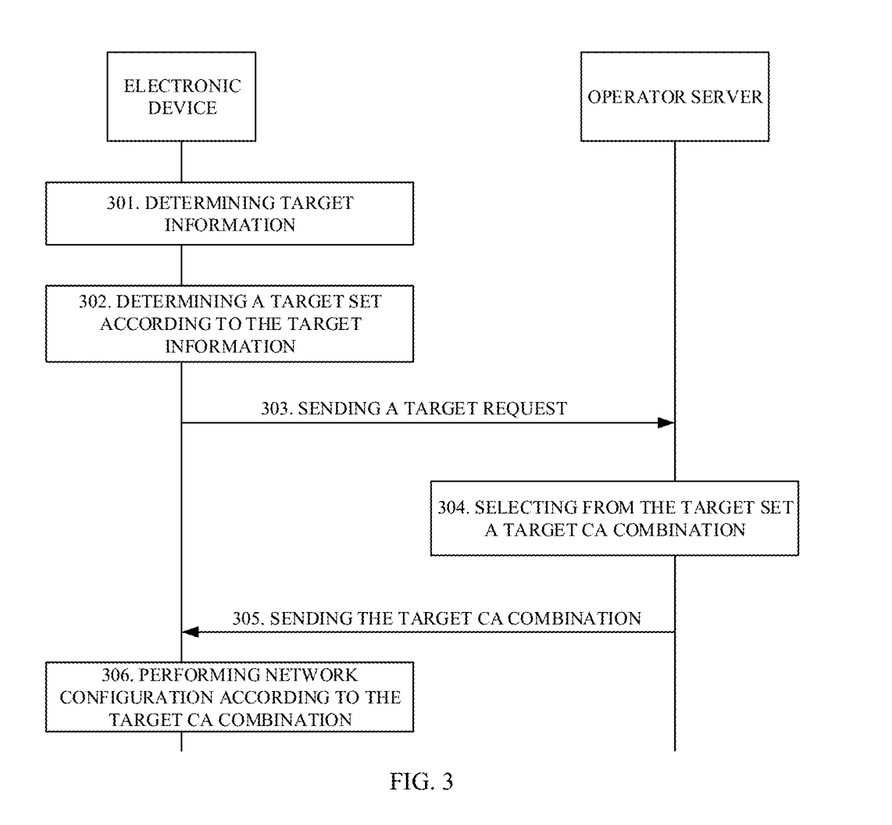
FIG. 3 is a schematic flowchart of a CA-based configuration method according to implementations.

FIG. 3 is a schematic flowchart of a CA-based configuration method according to implementations. The method is applicable to the electronic device described above. The method includes the following.

At block 301, the electronic device determines target information, where the target information includes an MCC and/or an MNC.

The MCC is defined by international telecommunication union (ITU), and is intended to identify, in a global system of mobile communication (GSM), a location of the electronic device. MCC is a part of an international mobile subscriber identity (IMSI), and is usually used in combination with the MNC to identify a network operator. Different MCCs are used to distinguish between different countries, but each country may have more than one MCC, for example, the MCC of China is 460 or 461, the MCC of the US is 310~316, and so on.

The MNC consists of 2 digits. For example, a time division (TD) system of China Mobile uses 00, a GSM system of China Unicom uses 01, a GSM system of China Mobile uses 02, and a code division multiple access (CDMA) system of China Telecom uses 03.

At block 302, the electronic device determines a target set according to the target information, where the target set includes multiple CA combinations supported by the electronic device.

A CA combination comprises carriers of at least two different frequency bands. For example, carrier A and carrier C constitute CA combination 1. For another example, carrier A, carrier B, and carrier C constitute CA combination 2. The disclosure is not limited in this regard. With development of 5G technology, there will be more forms of CA combinations.

It should be noted that, the multiple CA combinations included in the target set are some CA combinations among all CA combinations supported by the electronic device.

At block 303, the electronic device sends a target request to an operator server, where the target request carries the target set, and the target request is used to instruct to select from the target set a CA combination for network configuration.

The electronic device can send the target request directly to the operator server, or send the target request, via other devices, to the operator server, which is not limited herein.

At block 304, the operator server receives the target request, and selects from the target set a target CA combination.

As an example, the operator server selects from the target set the target CA combination as follows. The operator server determines a remaining allocation quota for each CA combination in the multiple CA combinations, to obtain multiple remaining allocation quotas, where each remaining allocation quota corresponds to one CA combination. The operator server determines a network load status value for each CA combination in the multiple CA combinations, to obtain multiple network load status values, where each network load status value corresponds to one CA combination. The operator server selects, from the multiple CA combinations, the target CA combination according to the multiple remaining allocation quotas and the multiple network load status values.

Since each CA combination is however not allocated to users without limitation, the operator server can pre-set an allocation quota for each CA combination. Then the operator server can determine the remaining allocation quota of each CA combination in the multiple CA combinations, to obtain the multiple remaining allocation quotas. On the other hand, the operator server can determine the network load status value for each CA combination in the multiple CA combinations, to obtain the multiple network load status values, where the network load status value is indicative of a load status of a CA combination and can be expressed in percentage. As such, the operator server can determine the target CA combination from the multiple CA combinations according to the multiple remaining allocation quotas and the multiple network load status values. For example, the operator server can determine a CA combination, of which the network load status value is small and the remaining allocation quota is not zero, as the target CA combination.

At block 305, the operator server sends the target CA combination to the electronic device in response to the target request.

The operator server can send the target CA combination directly to the electronic device, or send the target CA combination, via other devices, to the electronic device, which is not limited herein.

At block 306, the electronic device receives the target CA combination. The electronic device performs network configuration according to the target CA combination.

The electronic device can perform network configuration according to the target CA combination as follows. When the electronic device has enabled a CA function, the electronic device replaces a CA combination currently used by the electronic device with the target CA combination. Alternatively, when the CA function of the electronic device is currently disabled, the electronic device enables the CA function, and sets the target CA combination to be a CA combination used by the CA function.

According to implementations herein, the electronic device first determines the target information, where the target information includes the MCC and/or the MNC. Then the electronic device determines, according to the MCC and/or the MNC, multiple CA combinations supported by the electronic device. The electronic device sends the determined multiple CA combinations to the operator server. The operator server selects a CA combination for network configuration from the multiple CA combinations. The operator server sends the selected CA combination to the electronic device. The electronic device performs network configuration according to the selected CA combination. As such, a problem of redundant load of CA combinations can be solved.

In some implementations, the target information further includes at least one of: a model of the electronic device, a service type currently processed by the electronic device, an application running in the foreground of the electronic device, and a mobile network service package used by the electronic device.

The model of the electronic device is used for distinguishing between different electronic devices. When the electronic device is a smart phone, the model of the electronic device may be, for example, OPPOR11, OPPOR15, etc.

When the electronic device is a smart phone, the mobile network service package used by the electronic device may include, for example, GoTone, Easy Own, M-Zone, no traffic limitation, etc.

The service type includes one of the following: a video playback service, an audio playback service, a data download service, a data transmission service, a phone call service, a photographing service, a game service, an interface browsing service, a payment service, and the like.

The application includes one of the following: a video playback application, an audio playback application, a game application, an instant messaging (IM) application, a photographing application, a payment application, a shopping application, and the like.

In some implementations, the electronic device determines the target set according to the target information as follows. The electronic device determines, according to a mapping relationship between information and sets of CA combinations, the target set corresponding to the target information.

When the target information includes the MCC and/or the MNC, the electronic device determines, according to the mapping relationship between information and sets of CA combinations, the target set corresponding to the target information as follows. The electronic device determines, according to a mapping relationship between the MCC and/or the MNC and sets of CA combinations, the target set corresponding to the MCC and/or the MNC.

When the target information includes the MCC and the model of the electronic device, the electronic device determines, according to the mapping relationship between information and sets of CA combinations, the target set corresponding to the target information as follows. The electronic device determines, according to a mapping relationship between sets of CA combinations and the MCC and the model of the electronic device, the target set corresponding to the MCC and the model of the electronic device.

When the target information includes the MNC and the model of the electronic device, the electronic device determines, according to the mapping relationship between information and sets of CA combinations, the target set corresponding to the target information as follows. The electronic device determines, according to a mapping relationship between sets of CA combinations and the MNC and the model of the electronic device, the target set corresponding to the MNC and the model of the electronic device.

When the target information includes the MCC, the MNC, the model of the electronic device, and the service type currently processed by the electronic device, the electronic device determines, according to the mapping relationship between information and sets of CA combinations, the target set corresponding to the target information as follows. The electronic device determines, according to a mapping relationship between sets of CA combinations and the MCC, the MNC, the model of the electronic device, and the service type, the target set corresponding to the MCC, the MNC, the model of the electronic device, and the service type currently processed by the electronic device.

When the target information includes the MCC, the MNC, the model of the electronic device, the service type currently processed by the electronic device, and the application running in the foreground of the electronic device, the electronic device determines, according to the mapping relationship between information and sets of CA combinations, the target set corresponding to the target information as follows. The electronic device determines, according to a mapping relationship between sets of CA combinations and the MCC, the MNC, the model of the electronic device, the service type, and the application, the target set corresponding to the MCC, the MNC, the model of the electronic device, the service type currently processed by the electronic device, and the application running in the foreground of the electronic device.

It should be noted that, when the target information includes the MCC and the service type currently processed by the electronic device, or includes the MNC and the service type currently processed by the electronic device, or includes the MCC, the model of the electronic device, and the service type currently processed by the electronic device, or includes the MNC, the model of the electronic device, and the service type currently processed by the electronic device, or includes the MCC and the application running in the foreground of the electronic device, or includes the MNC and the application running in the foreground of the electronic device, or includes the MCC, the model of the electronic device, and the application running in the foreground of the electronic device, or includes the MNC, the model of the electronic device, and the application running in the foreground of the electronic device, or includes the MCC, the MNC, the model of the electronic device, and the application running in the foreground of the electronic device, the manner in which the electronic device determines the target set is similar to those described above and will not be respectively elaborated herein.

In some implementations, the method further includes the following before the electronic device determines the target information. The electronic device determines that the electronic device resides in a mobile network, or determines that the electronic device has switched from residing in a first mobile network to residing in a second mobile network.

In some implementations, the method further includes the following before the electronic device determines the target information. The electronic device determines that the service type currently processed by the electronic device is a target service type, or determines that the application running in the foreground of the electronic device is a target application.

The target service type may be a video playback service, an audio playback service, a data download service, a data transmission service, a phone call service, a photographing service, a game service, or the like, and the disclosure is not limited in this regard.

The target application may be a video playback application, an audio playback application, a game application, an IM application, a photographing application, or the like, and the disclosure is not limited in this regard.

In some implementations, the method further includes the following before the electronic device determines the target information. The electronic device determines that a current geographical location of the electronic device is not a usual place of residence.

The usual place of residence refers to a place where a user has lived for more than one year since leaving a domicile of the user.

As can be seen, the CA-based configuration method is executed only in some scenarios, which is possible to reduce to some extent power consumption of the electronic device, thereby improving performance of the electronic device.

In some implementations, after network configuration is performed according to the target CA combination, the following can be conducted. The electronic device disables the CA function when the electronic device moves out of the mobile network.

When the electronic device moves out of the mobile network, the electronic device will not need to use the CA function. In this situation, the CA function is disabled, which can improve performance of the electronic device.

Figure 4:
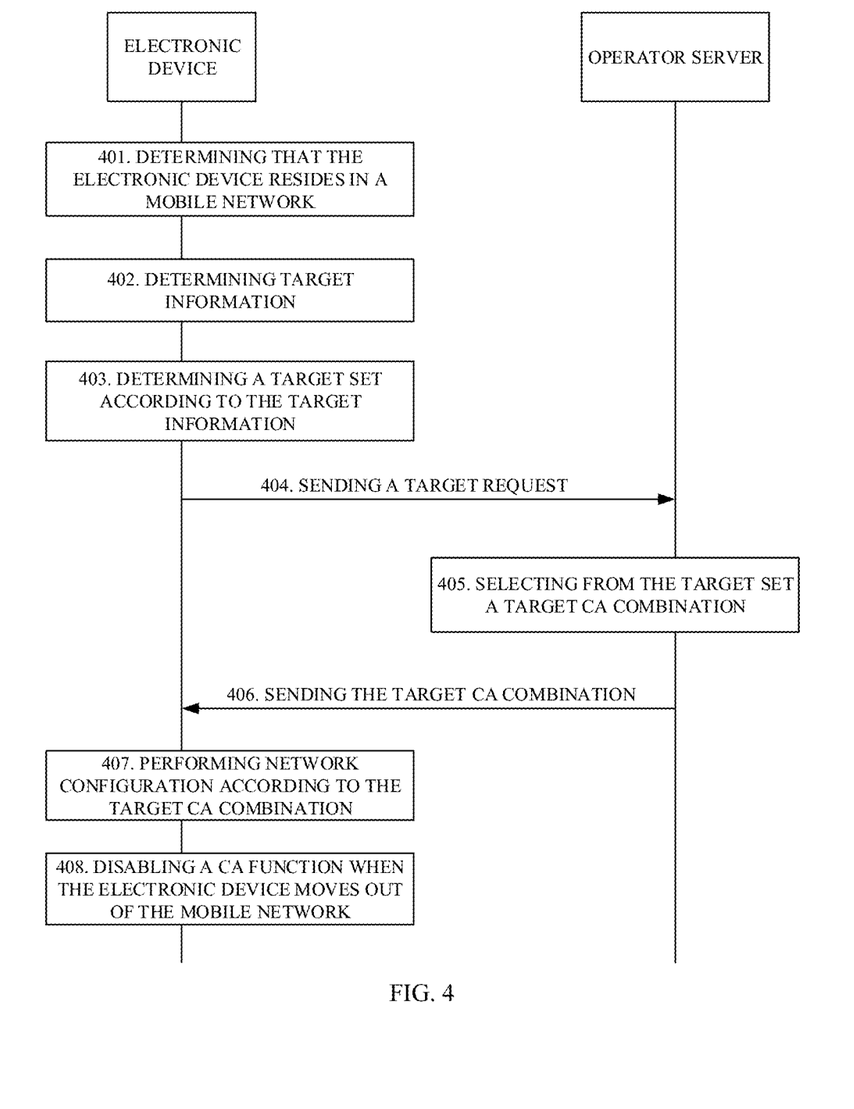
FIG. 4 is a schematic flowchart of a CA-based configuration method according to other implementations.

Similar to implementations illustrated in FIG. 3, FIG. 4 is a schematic flowchart of a CA-based configuration method according to other implementations. The method illustrated in FIG. 4 is applicable to an electronic device. As illustrated in FIG. 4, the method includes the following.

At block 401, the electronic device determines that the electronic device resides in a mobile network.

At block 402, the electronic device determines target information, where the target information includes an MCC and/or an MNC.

At block 403, the electronic device determines a target set according to the target information, where the target set includes multiple CA combinations supported by the electronic device.

At block 404, the electronic device sends a target request to an operator server, where the target request carries the target set, and the target request is used to instruct to select from the target set a target CA combination for network configuration.

At block 405, the operator server receives the target request. The operator server selects from the target set a target CA combination.

At block 406, the operator server sends the target CA combination to the electronic device in response to the target request.

At block 407, the electronic device receives the target CA combination, and performs network configuration according to the target CA combination.

At block 408, when the electronic device moves out of the mobile network, the electronic device disables a CA function.

It should be noted that, for the implementation process of each step of the method illustrated in FIG. 4, reference can be made to the description of the method illustrated in FIG. 3, which will not be repeated herein.

Figure 5:
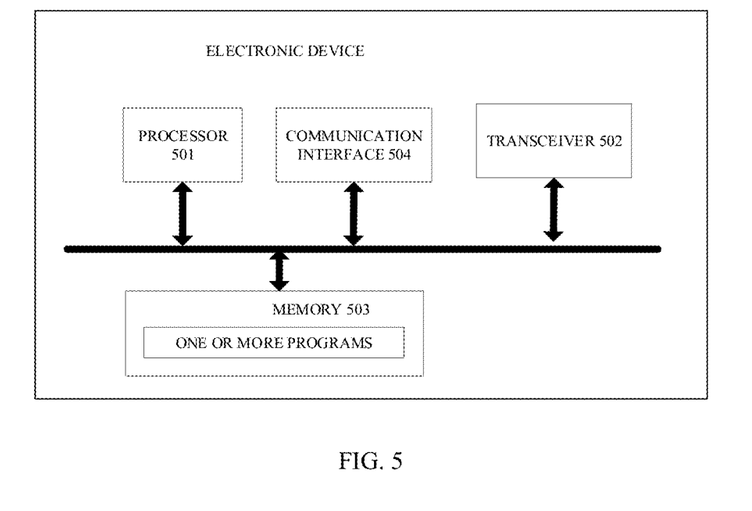
FIG. 5 is a schematic structural diagram of an electronic device according to other implementations.

Similar to implementations illustrated in FIG. 3 and FIG. 4, FIG. 5 is a schematic structural diagram of an electronic device according to other implementations. As illustrated in FIG. 5, the electronic device includes a processor 501, a transceiver 502, a memory 503, a communication interface 504. The transceiver 502 can transmit or receive data through the communication interface 504. One or more programs are stored in the memory 503 and configured to be executed by the processor 501. The one or more programs include instructions to perform the following. The one or more programs include instructions operable with the processor to: determine target information, where the target information includes an MCC and/or an MNC; determine a target set according to the target information, where the target set includes multiple CA combinations supported by the electronic device; send a target request, via the transceiver, to an operator server, where the target request carries the target set, and the target request is used to instruct to select from the target set a CA combination for network configuration; receive, via the transceiver, a target CA combination, where the target CA combination is sent by the operator server in response to the target request; perform network configuration according to the target CA combination.

According to implementations herein, the electronic device first determines the target information, where the target information includes the MCC and/or the MNC. Then the electronic device determines, according to the MCC and/or the MNC, multiple CA combinations supported by the electronic device. The electronic device sends the determined multiple CA combinations to the operator server. The operator server selects a target CA combination(s) for network configuration from the multiple CA combinations. The operator server sends the selected target CA combination to the electronic device. The electronic device performs network configuration according to the selected CA combination. As such, it is possible to avoid redundant load of CA combinations.

In some implementations, the target information further includes at least one of: a model of the electronic device, a service type currently processed by the electronic device, and an application running in the foreground of the electronic device.

In some implementations, in terms of determining the target set according to the target information, the one or more programs include instructions to determine, according to a mapping relationship between information and sets of CA combinations, the target set corresponding to the target information.

In some implementations, the one or more programs further include instructions to perform the following before determining the target information. The one or more programs further include instructions to determine that the electronic device resides in a mobile network.

In some implementations, the one or more programs further include instructions to perform the following before determining the target information. The one or more programs further include instructions to determine that the electronic device has switched from residing in a first mobile network to residing in a second mobile network.

In some implementations, the one or more programs further include instructions to perform the following before determining the target information. The one or more programs further include instructions to determine that the service type currently processed by the electronic device is a target service type.

In some implementations, the one or more programs further include instructions to perform the following before determining the target information. The one or more programs further include instructions to determine that the application running in the foreground of the electronic device is a target application.

In some implementations, the one or more programs further include instructions to perform the following before determining the target information. The one or more programs further include instructions to determine that a current geographical location of the electronic device is not a usual place of residence.

In some implementations, the one or more programs further include instructions to perform the following after performing network configuration according to the target CA combination. The one or more programs further include instructions to disable a CA function when the electronic device moves of the mobile network.

It should be noted that, for the implementation process of the implementations described above, reference can be made to the foregoing method implementations, which will not be repeated herein.

Figure 6:
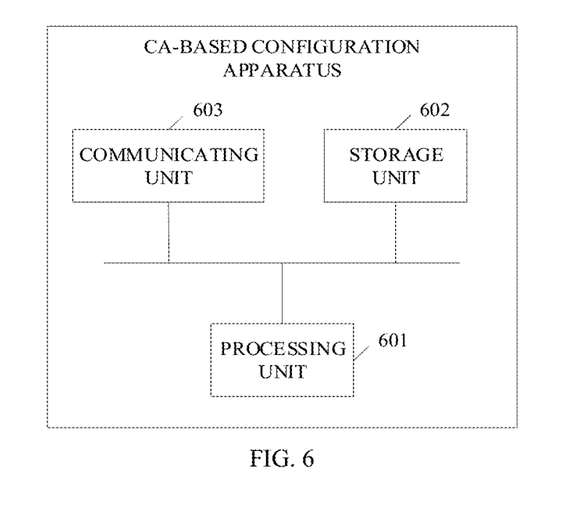
FIG. 6 is a schematic structural diagram of a CA-based configuration apparatus according to implementations.

FIG. 6 is a schematic structural diagram of a CA-based configuration apparatus according to implementations. The apparatus is applicable to an electronic device. The apparatus includes a processing unit 601, a storage unit 602, and a communicating unit 603.

The processing unit 601 is configured to operate as follows. The processing unit 601 is configured to determine target information, where the target information includes an MCC and/or an MNC. The processing unit 601 is configured to determine a target set according to the target information, where the target set includes multiple CA combinations supported by the electronic device. The processing unit 601 is configured to send a target request, via the communicating unit 603, to an operator server, where the target request carries the target set, and the target request is used to instruct to select from the target set a CA combination for network configuration. The processing unit 601 is configured to receive, via the communicating unit 603, a target CA combination, where the target CA combination is sent by the operator server in response to the target request. The processing unit 601 is configured to perform network configuration according to the target CA combination.

According to implementations herein, the CA-based configuration apparatus first determines the target information, where the target information includes the MCC and/or the MNC. Then the electronic device determines, according to the MCC and/or the MNC, multiple CA combinations supported by the electronic device. The electronic device sends the determined multiple CA combinations to an operator server. The operator server selects a target CA combination(s) for network configuration from the multiple CA combinations. The operator server sends the selected target CA combination to the electronic device. The electronic device performs network configuration according to the selected CA combination. As such, a problem of redundant load of CA combinations can be solved.

In some implementations, the target information further includes at least one of: a model of the electronic device, a service type currently processed by the electronic device, and an application running in the foreground of the electronic device.

In some implementations, in terms of determining the target set according to the target information, the processing unit 601 is configured to determine, according to a mapping relationship between information and sets of CA combinations, the target set corresponding to the target information.

In some implementations, the processing unit 601 is further configured to determine that the electronic device resides in a mobile network, before determining the target information.

In some implementations, the processing unit 601 is further configured to determine that the electronic device has switched from residing in a first mobile network to residing in a second mobile network, before determining the target information.

In some implementations, the processing unit 601 is further configured to determine that the service type currently processed by the electronic device is a target service type, before determining the target information.

In some implementations, the processing unit 601 is further configured to determine that the application running in the foreground of the electronic device is a target application, before determining the target information.

In some implementations, the processing unit 601 is further configured to determine that a current geographical location of the electronic device is not a usual place of residence, before determining the target information.

In some implementations, the processing unit 601 is further configured to disable a CA function when the electronic device moves out of the mobile network, after performing network configuration according to the target CA combination.

It should be noted that, the processing unit 601 can be implemented by a processor. The communicating unit 603 can be implemented by a communication interface. The storage unit 602 can be implemented by a memory.

Implementations further provide a computer storage medium. The computer storage medium is configured to store computer programs for electronic data interchange (EDI) which are configured to cause a computer to perform some or all operations of the method described in any one of the foregoing method implementations. The computer includes an electronic device.

Implementations further provide a computer program product. The computer program product includes a non-transitory computer readable storage medium which stores computer programs. The computer programs is operable to cause a computer to perform some or all operations of the method described in any one of the foregoing method implementations. The computer program product may be a software installation package. The computer includes an electronic device.

It should be noted that, for the convenience of description, the foregoing method implementations have been described as a series of combinations of actions. However, those skilled in the art should appreciate that implementations will not be limited to the described sequence of actions, because some of the steps can be performed in a different sequence or concurrently according to implementations. In addition, those skilled in the art should also appreciate that the implementations described in the specification are exemplary implementations, and that the actions and modules related thereto will not be necessarily required for implementations.

In the foregoing implementations, description of each implementation has its own emphasis. For details not described in one implementation, reference can be made to the related part in other implementations.

It will be appreciated that the apparatuses disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable memory. Based on such an understanding, the essential technical solution, or the portion that contributes to the related art, or all or part of the technical solution of the disclosure may be embodied as software products. The computer software products can be stored in a storage medium and may include multiple instructions that can cause a computing device, e.g., a personal computer, a server, a network device, etc., to execute some or all operations of the methods described in various implementations. The above memory may include various kinds of media that can store program codes, such as a universal serial bus (USB) flash disk, a read-only memory (ROM), a random access memory (RAM), a mobile hard drive, a magnetic disk, or an optical disk.

Those of ordinary skill in the art can understand that all or some steps in the foregoing method implementations can be completed by means of a program instructing relevant hardware. The program can be stored in a computer readable memory. The memory may include a flash disk, a ROM, a RAM, a magnetic disk, an optical disk, etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A carrier aggregation (CA)-based configuration method, being applicable to an electronic device and comprising:
   determining target information, wherein the target information comprises at least one of a mobile country code (MCC) and a mobile network code (MNC);
   determining a target set according to the target information, wherein the target set comprises a plurality of CA combinations supported by the electronic device;
   sending a target request to an operator server, wherein the target request carries the target set, and the target request is used to instruct to select, from the target set, a target CA combination;
   receiving a target CA combination, wherein the target CA combination is sent by the operator server in response to the target request; and
   performing network configuration according to the target CA combination.

2. The method of claim 1, wherein the target information further comprises at least one of: a model of the electronic device, a service type currently processed by the electronic device, and an application running in a foreground of the electronic device.

3. The method of claim 1, wherein determining the target set according to the target information comprises:
   determining, according to a mapping relationship between information and sets of CA combinations, the target set corresponding to the target information.

4. The method of claim 1, further comprising:
   before determining the target information,
     determining that the electronic device resides in a mobile network.

5. The method of claim 4, further comprising:
   after performing network configuration according to the target CA combination,
     disabling a CA function in response to the electronic device moving out of the mobile network.

6. The method of claim 1, further comprising:
   before determining the target information,
     determining that the electronic device has switched from residing in a first mobile network to residing in a second mobile network.

7. The method of claim 1, further comprising:
   before determining the target information,
     determining that a service type currently processed by the electronic device is a target service type.

8. The method of claim 1, further comprising:
   before determining the target information,
     determining that the application running in a foreground of the electronic device is a target application.

9. The method of claim 1, further comprising:
   before determining the target information,
     determining that a current geographical location of the electronic device is not a usual place of residence.

10. An electronic device, comprising:
    a processor;
    a transceiver;
    a memory configured to store one or more programs which, when executed by the processor, are operable with the processor to:
      determine target information, wherein the target information comprises at least one of an MCC and an MNC;
      determine a target set according to the target information, wherein the target set comprises a plurality of CA combinations supported by the electronic device;
      send a target request, via the transceiver, to an operator server, wherein the target request carries the target set, and the target request is used to instruct to select, from the target set, a CA combination for network configuration;
      receive, via the transceiver, a target CA combination, wherein the target CA combination is sent by the operator server in response to the target request; and
      perform network configuration according to the target CA combination.

11. The electronic device of claim 10, wherein the target information further comprises at least one of: a model of the electronic device, a service type currently processed by the electronic device, and an application running in a foreground of the electronic device.

12. The electronic device of claim 10, wherein the processor configured to determine the target set according to the target information is configured to:
    determine, according to a mapping relationship between information and sets of CA combinations, the target set corresponding to the target information.

13. The electronic device of claim 10, wherein the processor is further configured to:
    before determining the target information,
      determine that the electronic device resides in a mobile network.

14. The electronic device of any of claim 13, wherein the processor is further configured to:
    after performing network configuration according to the target CA combination,
      disable a CA function when the electronic device moves out of the mobile network.

15. The electronic device of claim 10, wherein the processor is further configured to:
    before determining the target information,
      determine that the electronic device has switched from residing in a first mobile network to residing in a second mobile network.

16. The electronic device of claim 10, wherein the processor is further configured to:
    before determining the target information,
      determine that a service type currently processed by the electronic device is a target service type.

17. The electronic device of claim 10, wherein the processor is further configured to:
    before determining the target information,
      determine that an application running in a foreground of the electronic device is a target application.

18. The electronic device of claim 10, wherein the processor is further configured to:
    before determining the target information,
      determine that a current geographical location of the electronic device is not a usual place of residence.

19. A non-transitory computer readable storage medium configured to store computer programs which, when executed by an electronic device, are operable with the electronic device to:
    determine target information, wherein the target information comprises at least one of an MCC and an MNC;

determine a target set according to the target information, wherein the target set comprises a plurality of CA combinations supported by the electronic device;

send a target request to an operator server, wherein the target request carries the target set, and the target request is used to instruct to select, from the target set, a CA combination for network configuration;

receive a target CA combination, wherein the target CA combination is sent by the operator server in response to the target request; and perform network configuration according to the target CA combination.

20. The non-transitory computer readable storage medium of claim 19, wherein when executed by the electronic device, the computer programs are further operable with the electronic device to:

disable a CA function in response to the electronic device moving out of a currently resided mobile network.

\* \* \* \* \*